United States Patent
Wookey

(10) Patent No.: US 8,005,791 B1
(45) Date of Patent: Aug. 23, 2011

(54) METHODS AND SYSTEMS FOR PUBLISHING AGGREGATED DATA TO A BUSINESS LOGIC TIER

(75) Inventor: Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 616 days.

(21) Appl. No.: 11/080,894

(22) Filed: Mar. 14, 2005

(51) Int. Cl.
*G06F 7/00* (2006.01)
*G06F 17/00* (2006.01)

(52) U.S. Cl. ........................... 707/632; 707/614
(58) Field of Classification Search ............... 707/6, 10, 707/632, 614
See application file for complete search history.

(56) References Cited

U.S. PATENT DOCUMENTS

| | | | |
|---|---|---|---|
| 5,247,647 A | 9/1993 | Brown et al. | |
| 5,765,174 A | 6/1998 | Bishop | |
| 5,913,061 A * | 6/1999 | Gupta et al. | 719/310 |
| 6,314,427 B1 * | 11/2001 | Goldman et al. | 707/102 |
| 6,421,690 B1 | 7/2002 | Kirk, III | |
| 6,834,382 B2 | 12/2004 | Marso et al. | |
| 6,886,041 B2 | 4/2005 | Messinger et al. | |
| 6,886,166 B2 | 4/2005 | Harrison et al. | |
| 6,904,454 B2 | 6/2005 | Stickler | |
| 6,920,476 B2 | 7/2005 | McGann et al. | |
| 7,062,706 B2 | 6/2006 | Maxwell et al. | |
| 7,177,859 B2 * | 2/2007 | Pather et al. | 707/3 |
| 7,246,104 B2 | 7/2007 | Stickler | |
| 2002/0004796 A1 | 1/2002 | Vange et al. | |
| 2002/0035482 A1 * | 3/2002 | Coble et al. | 705/1 |
| 2002/0035617 A1 * | 3/2002 | Lynch et al. | 709/219 |
| 2002/0091736 A1 | 7/2002 | Wall | |
| 2002/0188497 A1 | 12/2002 | Cerwin | |
| 2004/0059744 A1 | 3/2004 | Duncan et al. | |
| 2004/0153447 A1 | 8/2004 | Hiratsuka et al. | |
| 2005/0028080 A1 * | 2/2005 | Challenger et al. | 715/501.1 |
| 2005/0192955 A1 | 9/2005 | Farrell | |
| 2006/0117005 A1 * | 6/2006 | Stewart et al. | 707/6 |

* cited by examiner

*Primary Examiner* — Apu Mofiz
*Assistant Examiner* — Chelcie Daye
(74) *Attorney, Agent, or Firm* — Marsh Fischmann & Breyfogle LLP; Kent A. Lembke; Christopher P. Rauch

(57) ABSTRACT

Methods, systems, and articles of manufacture consistent with the present invention provide synchronous notification of incoming information from a data access tier to a business tier application. The business tier application receives subscribed to information together with associated information, as identified in an information model to which the subscribed to information belongs.

13 Claims, 6 Drawing Sheets

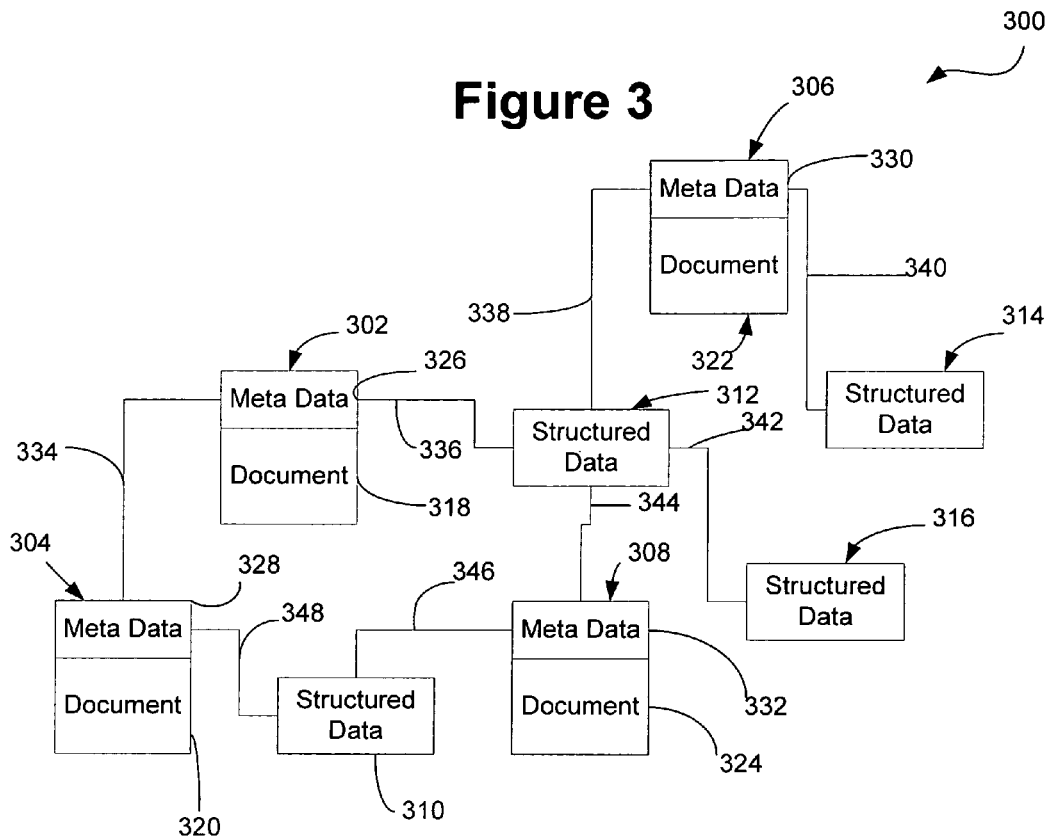
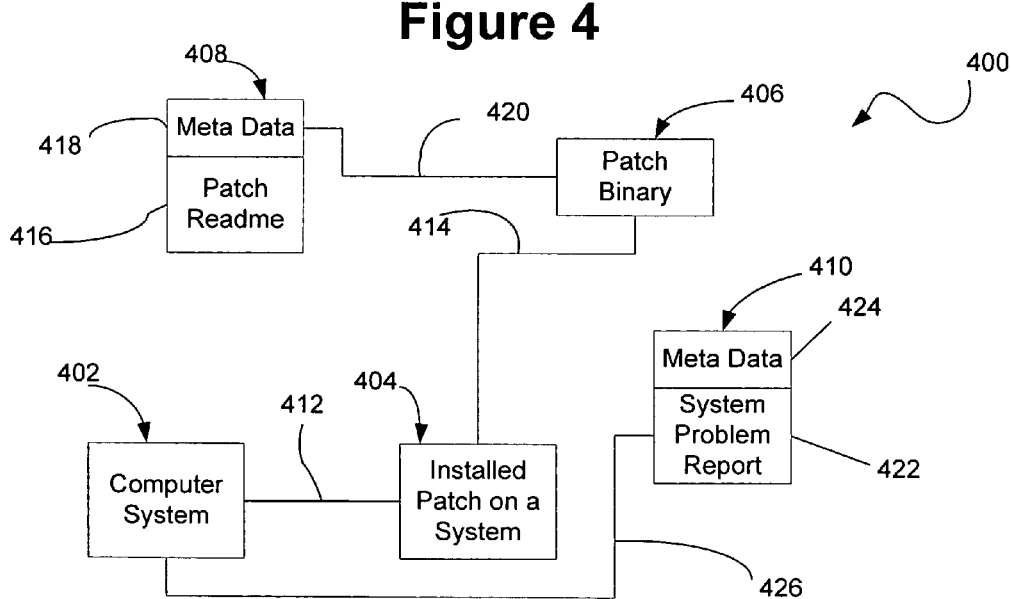

METHODS AND SYSTEMS FOR PUBLISHING AGGREGATED DATA TO A BUSINESS LOGIC TIER

CROSS-REFERENCE TO RELATED APPLICATIONS

This Application is related to the following U.S. Patent Applications, which are filed concurrently with this Application, and which are incorporated herein by reference to the extent permitted by law:

U.S. Ser. No. 11/080,085, entitled "METHODS AND SYSTEMS FOR CACHING INFORMATION MODEL NODES,"

U.S. Ser. No. 11/080,893, entitled "METHODS AND SYSTEMS FOR IDENTIFYING ASSOCIATIONS BETWEEN INFORMATION MODEL NODES,"

U.S. Ser. No. 11/080,839, entitled "METHODS AND SYSTEMS FOR PERFORMING HIGH-THROUGHPUT INFORMATION REFINEMENT,"

U.S. Ser. No. 11/080,831, entitled "METHODS AND SYSTEMS FOR DYNAMICALLY ALLOCATING INFORMATION REFINEMENT RESOURCES," and U.S. Ser. No. 11/080,896, entitled "METHODS AND SYSTEMS FOR DYNAMICALLY GENERATING A NEW NODE IN AN INFORMATION MODEL".

FIELD OF THE INVENTION

The present invention relates to methods and systems for managing data for a business tier application, and in particular, to methods and systems for providing synchronous notification of incoming data to the business tier application.

BACKGROUND OF THE INVENTION

Corporations and other enterprises commonly implement their business services on computer systems using a tiered architecture model that provides benefits such as reusability, flexibility, manageability, maintainability, and scalability for a business tier application. The tiered architecture model segments an application's components into three tiers of services, the presentation or visualization tier, the middle or business logic tier, and the data or resource tier. These tiers do not necessarily correspond to physical locations on various computers on a network, but rather to logical layers of the application.

The visualization tier or layer provides an interface for the end user into the application. The business logic tier or layer (also referenced as the application layer), typically includes application specific code or components for enforcing a set of business and data rules used to implement a given business service. The resource tier is a data management layer for storing and retrieving information or persistent data usually stored in a database or in permanent storage.

In one implementation of the tiered architecture model, the application layer is operatively connected to the resource layer through information model nodes, which function as an interim translation layer for access to the persistent data that reside in the resource tier. An information model typically describes the combination of a data model (one type of information model node) and a content model (another type of information model node) together with one or more associations between information model nodes. A data model describes the techniques for describing well structured data within an application. For example, the technique or structure for formatting a paragraph in a document created using the Microsoft® Word application may be represented in a data model. A content model is a set of meta data that describes unstructured data, such as data that a user writes in a document described by a given information model. The meta data of the content model may describe associations between the unstructured data as well as information about the unstructured data. For example, the content model for the document created using the Microsoft® Word application may define meta data to include author, date created, data classification (e.g., letter, diagram, spreadsheet, etc.).

One of the problems that conventional business logic tiers face is immediacy of relevant information. For example, in a services automation architecture, customers typically expect that changes in their environment can be detected and realized by the services automation system within a certain period of time. The challenge that faces the architecture is that of being able to process telemetry data streams inbound from the customer in an efficient manner such that the customer's expectations can be met. However, telemetry data only supplies hints to configuration problems. Therefore, the telemetry data typically requires processing for potential availability issues or performance concerns prior to the realization of potential problems. Thus, by the time a potential problem is identified, the identification may be too late.

Further, in traditional architectures, the business logic tier periodically polls the resource tier for the telemetry data. Accordingly, the telemetry data may arrive at the business logic tier too late to be effective.

Therefore, a need has long existed for a method and system that overcome the problems noted above and others previously experienced.

SUMMARY OF THE INVENTION

Methods, systems, and articles of manufacture consistent with the present invention provide synchronous notification of incoming information from a data access tier to a business tier application. The business tier application receives subscribed to information together with associated information, as identified in an information model to which the subscribed to information belongs.

In an illustrative example, the business tier application desires to receive information relating to system problem reports for a particular computer system. The system problem reports are contained in a node of an information model, which identifies other nodes that are associated with the system problem reports. The information in the associated nodes may be most relevant when that information is received by the business tier application in a timely manner together with desired node. For example, it may be beneficial for the business tier application to receive a system problem report together with a new software patch that is held in an associated node, so that the business tier application can apply the patch in a timely manner.

A data latching module and an information refinement module work together to collect the subscribed to information and relevant associated information prior to publishing the subscribed to information to the business tier application. Thus, the business tier information receives what it asked for as well as other relevant information that is timely.

Therefore, the business tier application is not burdened by having to poll a resource tier for information, but instead receives desired information asynchronously through subscription. Further, although the business tier application may subscribe to a particular type of information, the business tier application receives other relevant information together with the subscribed to information. This enables the business tier application to be more effective.

In accordance with methods consistent with the present invention, a method in a data processing system having a business tier application is provided. The method comprises the steps of: subscribing to a first information; and receiving the first information together with other information that is associated with the first information responsive to the subscription model, the association of the first information and the other information being identified in an information model. A publisher of the first information together with the other information refrains from publishing the first information together with the other information until the other information is available.

In accordance with articles of manufacture consistent with the present invention, a computer-readable medium containing instructions that cause a data processing system having a program to perform a method is provided. The method comprises the steps of: subscribing to a first information; and receiving the first information together with other information that is associated with the first information responsive to the subscription model, the association of the first information and the other information being identified in an information model. A publisher of the first information together with the other information refrains from publishing the first information together with the other information until the other information is available.

In accordance with systems consistent with the present invention, a data processing system is provided that comprises a memory having a program and a processing unit that runs the program. The program subscribes to a first information, and receives the first information together with other information that is associated with the first information responsive to the subscription model, the association of the first information and the other information being identified in an information model. A publisher of the first information together with the other information refrains from publishing the first information together with the other information until the other information is available.

In accordance with methods consistent with the present invention, a method in a data processing system having a program is provided. The method comprises the steps of: subscribing to a first information; receiving the first information responsive to the subscription; determining whether the first information is associated with other information by analyzing an information model to which the first information belongs, the information model identifying the first information and the associated other information; obtaining the other information when it is determined that the first information is associated with the other information; and publishing the first information together with the determined other information to a network.

In accordance with articles of manufacture consistent with the present invention, a computer-readable medium containing instructions that cause a data processing system having a program to perform a method is provided. The method comprises the steps of: subscribing to a first information; receiving the first information responsive to the subscription; determining whether the first information is associated with other information by analyzing an information model to which the first information belongs, the information model identifying the first information and the associated other information; obtaining the other information when it is determined that the first information is associated with the other information; and publishing the first information together with the determined other information to a network.

In accordance with systems consistent with the present invention, a data processing system is provided that has a memory including a program and a processing unit that runs the program. The program subscribes to a first information, receives the first information responsive to the subscription, determines whether the first information is associated with other information by analyzing an information model to which the first information belongs, the information model identifying the first information and the associated other information, obtains the other information when it is determined that the first information is associated with the other information, and publishes the first information together with the determined other information to a network.

In accordance with methods consistent with the present invention, a method in a data processing system having a program is provided. The method comprises the steps of: receiving a subscription for a first information; determining whether the first information is associated with other information by analyzing an information model to which the first information belongs, the information model identifying the first information and the associated other information; storing at least one of the first information and determined other information as it becomes available; determining when the first information has been stored; and publishing the first information together with the stored other information to a network when it is determined that the first information has been stored.

In accordance with articles of manufacture consistent with the present invention, a computer-readable medium containing instructions that cause a data processing system having a program to perform a method is provided. The method comprises the steps of: receiving a subscription for a first information; determining whether the first information is associated with other information by analyzing an information model to which the first information belongs, the information model identifying the first information and the associated other information; storing at least one of the first information and determined other information as it becomes available; determining when the first information has been stored; and publishing the first information together with the stored other information to a network when it is determined that the first information has been stored.

In accordance with systems consistent with the present invention, a data processing system is provided that comprises a memory having a program and a processing unit that runs the program. The program receives a subscription for a first information; determines whether the first information is associated with other information by analyzing an information model to which the first information belongs, the information model identifying the first information and the associated other information; stores at least one of the first information and determined other information as it becomes available; determines when the first information has been stored; and publishes the first information together with the stored other information to a network when it is determined that the first information has been stored.

In accordance with systems consistent with the present invention, a data processing system is provided. The data processing system comprises: means for receiving a subscription for a first information; means for determining whether the first information is associated with other information by analyzing an information model to which the first information belongs, the information model identifying the first information and the associated other information; means for storing at least one of the first information and determined other information as it becomes available; means determining when the first information has been stored; and means publishing the first information together with the stored other information to a network when it is determined that the first information has been stored.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 3 depicts a block diagram of an exemplary information model having nodes that may be accessed by a business tier application of the data processing system;

FIG. 4 depicts a block diagram of another exemplary infrastructure of information models that may be accessed by the business tier application of the data processing system;

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
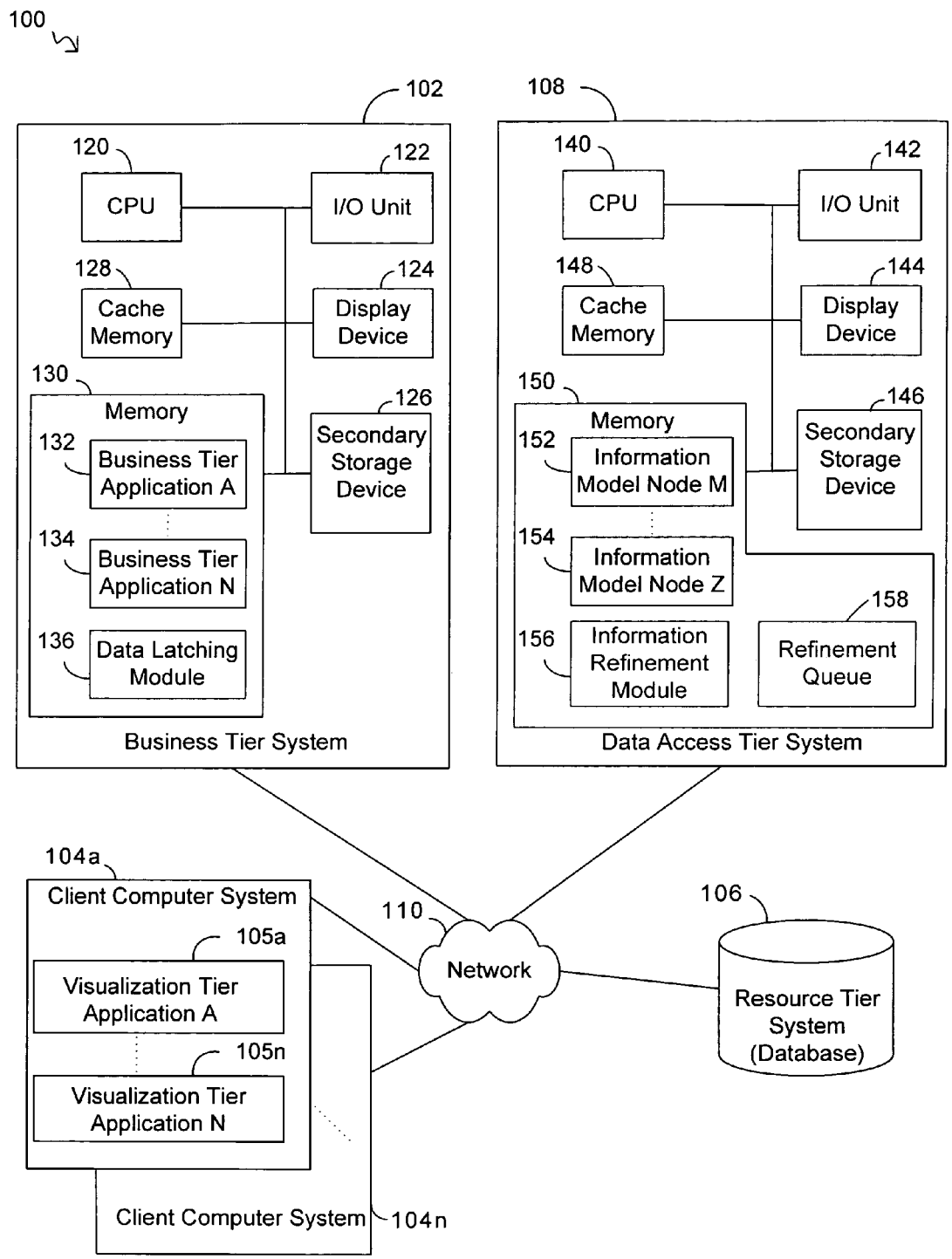
FIG. 1 depicts a block diagram of an exemplary data processing system in accordance with methods, systems, and articles of manufacture consistent with the present invention.
Figure 2:
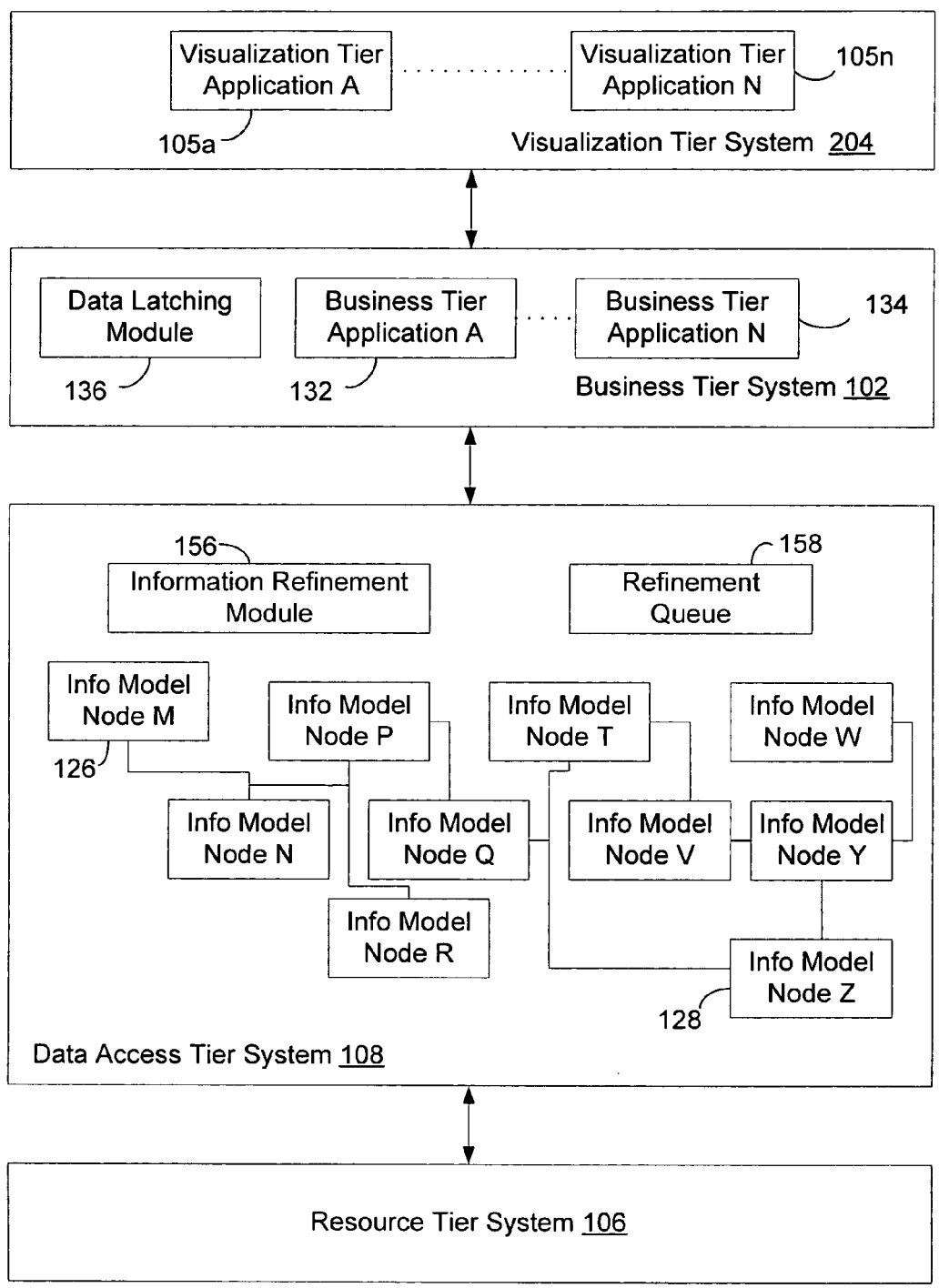
FIG. 2 depicts an exemplary functional block diagram of the data processing system.

FIG. 1 depicts a block diagram of a data processing system 100 suitable for use with methods and systems consistent with the present invention. FIG. 2 depicts an exemplary functional block diagram of the data processing system 100. Data processing system 100 is referred to hereinafter as "the system." The system has a tiered architecture for implementing and managing one or more business tier applications of an enterprise. The system comprises a business tier system 102 (shown functionally as business tier system 102 in FIG. 2), one or more client computer systems 104a-104n that collectively function as a visualization tier system 204 in FIG. 2, a resource tier system 106, and a data access tier system 108. The business tier system 102 is operatively connected to each client computer system 104a-104n, to the resource tier system 106, and to the data access tier system 108 via a network 110. The network 110 may be a suitable private or public communication network, such as a local area network ("LAN"), WAN, Peer-to-Peer, or the Internet, using standard communications protocols. The network 110 may include hardwired as well as wireless branches.

The business tier system 100 and the data access tier system 108 may be Sun®SPARC® data processing systems running the Solaris® operating system. One having skill in the art will appreciate that devices and programs other than those described in the illustrative examples can be implemented. Sun, Java, and Solaris and are trademarks or registered trademarks of Sun Microsystems, Inc., Palo Alto, Calif., in the United States and other countries. SPARC is a registered trademark of SPARC International, Inc., in the United States and other countries. Other names may be trademarks or registered trademarks of their respective owners.

The business tier system comprises a central processing unit (CPU) 120, an input/output (I/O) unit 122, a display device 124, a secondary storage device 126, a cache memory 128, and a memory 130. The business tier system may further comprise standard input devices such as a keyboard, a mouse or a speech processing means (each not illustrated).

The data access tier system comprises a central processing unit (CPU) 140, an input/output (I/O) unit 142, a display device 144, a secondary storage device 146, a cache memory 148, and a memory 150. The data access tier system may further comprise standard input devices such as a keyboard, a mouse or a speech processing means (each not illustrated).

Client computer systems 104a-104n each comprise similar components to those of the business tier and data access systems, such as a CPU, a memory, an I/O device, a display device, and a secondary storage. In one implementation, each client computer 104a-104n may be a general-purpose computer system such as an IBM compatible, Apple, or other suitable data processing system. The client computer systems may comprise one or more visualization tier applications in their respective memories. In the illustrative example, client computer system 104a comprises, in memory, visualization tier applications A-N 105a-105n.

Resource tier system 106 may be a database accessible by the information refinement module, the data latching module, and the business tier applications via a relational database management system (RDBMS—not shown in figures). Alternatively, the resource tier system may be a file server accessible by the information refinement module, the data latching module, and the business tier applications, for example, via a Lightweight Directory Access Protocol (LDAP)—not shown in figures).

Memory 130 of the business tier system comprises one or more business tier applications 132 and 134 (also referenced as "business service applications") that are operatively configured to receive data from or transmit data to visualization tier applications 105a-105n operating on client computer systems 104a-104n. For example, visualization tier "A" 105a may be a browser program that interfaces to the business tier application "A" 132, which may be a web server application for a product fault reporting and identification service for an enterprise implementing the system 100. In another illustrative example, visualization tier "N" 105n may be a user interface for accessing a document editor and maintenance service program (e.g., business tier application "N" 134), such as Docs Open® commercially available from Hummingbird Ltd.

Business tier system memory 130 further comprises a data latching module 136. As will be described in more detail below, one or more of the business tier applications can subscribe to information from the resource tier system via the data latching module. The subscribed to information may be part of an information model that includes associations between the subscribed to information and other information. For example, the business tier application may subscribe to an information model node, which is a data type for hardware faults. The hardware fault node may be associated with other nodes, such as child nodes in the information model. The data latching module coordinates with an information refinement module 156 in the data access tier system to ensure that the subscribed to node and its associated nodes are provided to a business tier application in a timely manner.

Illustrative information model nodes 152 and 154 are shown as stored in memory 150 of the data access tier system. Alternatively, the information model nodes can be stored one or more different locations, such as in the data access tier system secondary storage. As described above, data latching module 136 of the business tier system coordinates with information refinement module 156 of the data access tier system to provide timely information to business tier applications. The business tier applications register subscriptions for information model nodes with the data latching module, which in turn registers corresponding subscriptions with the information refinement module. Therefore, when relevant data is received, the information refinement model asynchronously forwards the subscribed to information to the data latching module, which in turn forwards the data to the relevant business tier applications. However, before forwarding the data to the data latching module, the information refinement module looks to the information model and retrieves data from nodes that are associated with the subscribed to node. If any of the associated data was not yet available to the information refinement module, the data latching module then retrieves the remaining associated data from the resource tier system or from the data access tier system memory. Thus, before forwarding the subscribed to information to the business tier applications, the data latching module ensures that relevant associated data is retrieved and ready to forward. Accordingly, the business tier applications receive items of information that are timely with respect to each other, allowing the business tier applications to be most effective.

One having skill in the art will appreciate that the programs described herein, such as the business tier applications, the data latching module, and the information refinement module, may each be stand-alone programs residing in memory on one or more data processing systems other than illustrative systems. The programs may each comprise or may be included in one or more code sections containing instructions for performing their respective operations. While the programs are described as being implemented as software, the present implementation may be implemented as a combination of hardware and software or hardware alone. Also, one having skill in the art will appreciate that the programs may comprise or may be included in a data processing device, which may be a client or a server, communicating with the illustrative systems.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; or other forms of ROM or RAM either currently known or later developed. Further, although specific components of system 100 have been described, one having skill in the art will appreciate that a data processing system suitable for use with methods, systems, and articles of manufacture consistent with the present invention may contain additional or different components.

FIG. 3 depicts an exemplary infrastructure 300 of information model nodes 302 . . . 316 that may be designed for and accessed by information refinement module 156 and data latching module 136. Information model nodes 302 . . . 316 may be a portion of the information model nodes 152 and 154 stored in the data access tier system. As shown in FIG. 3, information model nodes 302 . . . 316 may comprise content models 302 . . . 308 and data models 310 . . . 316. Each of the content models includes respective unstructured data (e.g., a document or portion thereof) 318, 320, 322, and 324, and meta data 326, 328, 330, and 332 that describes the respective unstructured data. Each meta data 326, 328, 330, and 332 may include one or more data elements that identify characteristics of the unstructured data specified at the time the unstructured data was designed or created. For example, meta data 326, 328, 330, and 332 may each have data elements that identify an author, a creation date, and an average size of the respective unstructured data 318, 320, 322, and 324.

Each of the data models 310 . . . 316 describes structured data relevant to one or more business tier applications 132 and 134. The data models 310 . . . 316 may be preexisting data models defined at the time the business tier applications were designed or used. Each of the information model nodes has one or more static associations 334, 336, 338, 340, 342, 344, 346, and 348 each of which identifies a relationship to another node. Each of the static associations 334, 336, 338, 340, 342, 344, 346, and 348 may be a pointer or index to the other node.

FIG. 4 shows an example of an illustrative infrastructure 400 of information model nodes 402 . . . 410 that are designed, for example, for business tier application 132 that corresponds to a computer system fault reporting and identification service. Information model 400 for the computer system fault reporting and identification service may contain hundreds or thousands of nodes. However, for clarity in the description, only nodes 402 . . . 410 are illustrated. In this example, information model node 402 corresponds to structured data that describes elements of a computer system serviced by business tier application 132. Table 1 below identifies an illustrative format of the structured data for information model node 402 to describe a computer system.

TABLE 1

| Category | Element Name | SubElement Name | Description | Data Type with delimiter (e.g., ";") to separate multiple entries |
|---|---|---|---|---|
| Hardware | Computer System | | Model number and configuration version for the computer system | String delimiter string |
| | Motherboard | | Model number of motherboard version in the computer system | String |
| | | CPU | Model numbers of compatible CPU | String |
| | | RAM | Type and size of compatible random access memory. | String |
| | Video card | | Model numbers of compatible video card | String |
| | Modem | | Model numbers of compatible modem | String |
| | Harddrive controller | | Model numbers of compatible harddrive controller | String |
| | Harddrive | | Model numbers of compatible harddrive | String |
| | CD/DVD controller | | Model numbers of compatible controllers | String |

TABLE 1-continued

| Catagory | Element Name | SubElement Name | Description | Data Type with delimiter (e.g., ";") to separate multiple entries |
|---|---|---|---|---|
| | Display | | Model numbers of compatible displays | String |
| Software | Motherboard Firmware | | Filename/version | String delimiter string |
| | Operating System (OS) | | Filename/version | String delimiter string |

Information model node 404 corresponds to structured data that identifies that a patch has been created for and should be installed on the computer system described by information model node 402. Patch information model node 404 may include data elements that identify the patch (e.g., a patch filename, version number, a creation date, size, and author), the operating system name for installing the patch, and the computer system name in which the operating system is installed. Thus, a static data association 412 between nodes 402 and 404 may be identified when the information model node 404 is designed or created based on the operating system name or computer system name identified by both nodes 402 and 404. In one implementation, a data association may be reflected by a pointer to the related node. Thus, information model node 402 may have a pointer to information model node 404, and vice versa, to reflect the data association 412 between the two nodes.

Continuing with the example shown in FIG. 4, information model node 406 corresponds to structured data that describes the patch identified by information model node 404 and has an association 414 based on the patch filename identified by both nodes 404 and 406. Information model node 408 corresponds to a content model that has unstructured data (e.g., the "patch readme" document 416) written, for example, by the author of the patch to identify what fault the patch corrects and how to install the patch on the computer system identified by information model node 402. The information model node 408 also has meta data 418 that may identify the patch filename, a version number, the author of document 416, and the date that document 416 was created. Thus, when information model node 408 is designed or created, an association 420 may be generated to reflect a relationship between the two nodes 406 and 408 based on a common data element, such as patch filename or patch author.

In the example shown in FIG. 4, information model node 410 is a content model that has unstructured data (e.g., "system problem report" document 422) written, for example, by a customer reporting a problem or fault with a computer system as described by information model node 402. Information model node 410 also has meta data 424 that identifies, for example, the customer that authored the report, a creation date, and the name of the computer system having the fault. In accordance with methods, systems, and articles of manufacture consistent with the present invention, the customer may report a problem to business tier application 132 via a respective visualization tier application 105*a* on one of the client computers 104*a*-104*b*. Business tier application 132 then generates and stores information model node 410 on the resource tier system 106. In the implementation shown in FIG. 4, information model node 410 (e.g., "system problem report" document 422) is initially designed to have a static association 426 with information model node 402 ("system computer") to reflect a relationship between the two nodes 410 and 402 based on a common data element, such as computer system name. The designer of the information model depicted in FIG. 4 may have designed the information model nodes 402, 410, and the association 426 before revising the information model to incorporate nodes 406 and 408 for handling a "patch" to, for example, the "operating system" software for the computer system identified by the instantiation of the information model node 402. Thus, the designer of information model node 410 may not have foreseen what types of problems associated with the computer system (i.e., information model node 402) that a customer may need to report and what corresponding corrections would be developed and made available.

Figure 5:
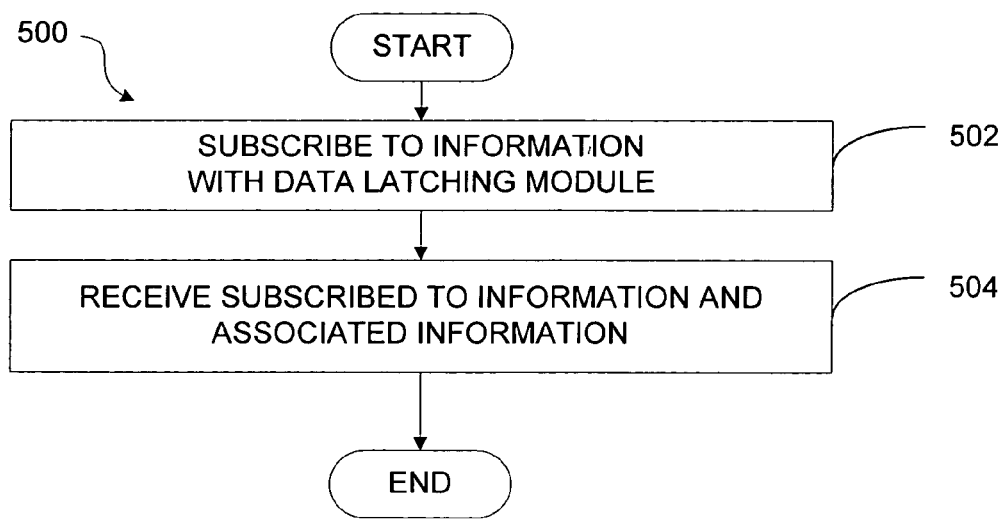
FIG. 5 depicts a flow diagram illustrating exemplary steps performed by the business tier application.

FIG. 5 depicts a flow diagram 500 illustrating exemplary steps performed by the business tier application, such as business tier application 132, consistent with the present invention. The business tier application registers a subscription for information with the data latching module (step 502). When registering the subscription, the business tier application can identify, for example, a data type (i.e., an information model node) or a field of a data type. For example, the business tier application could subscribe to all nodes of the type HardwareAlert and qualify the subscription by "where severity=red." In that example, severity and the types allowed in the fields are described in the illustrative conceptual model.

In an illustrative example, the business tier application wants to receive information about known system problems associated with a particular computer system. Thus, the business tier application subscribes to a data type for system problem reports for that computer system, i.e., the business tier application subscribes to information model node 410. As shown in FIG. 4, information model node 410 is associated with other information model nodes, namely nodes 402, 404, 406, and 408. However, as will be described in more detail below, the business tier application may receive the information from nodes 402, 404, 406, and 408 simply by subscribing to node 410. The data latching module and information refinement module work together to provide to the business tier application the information from node 410 as well as its associated nodes 402, 404, 406, and 408.

Since the business tier application receives the subscribed to information via a publish-subscribe mechanism, the business tier application receives the information asynchronously (step 504). That is, when the information is available to the data latching module, it is published by the data latching module to the business tier application without the business tier application having to poll for the information. Before publishing the subscribed to information to the business tier application, the data latching module ensures that relevant associated information is also retrieved and ready to forward. Accordingly, the business tier application receives the subscribed to information and associated information while they are timely with respect to each other, allowing the business tier applications to be most effective.

Figure 6:
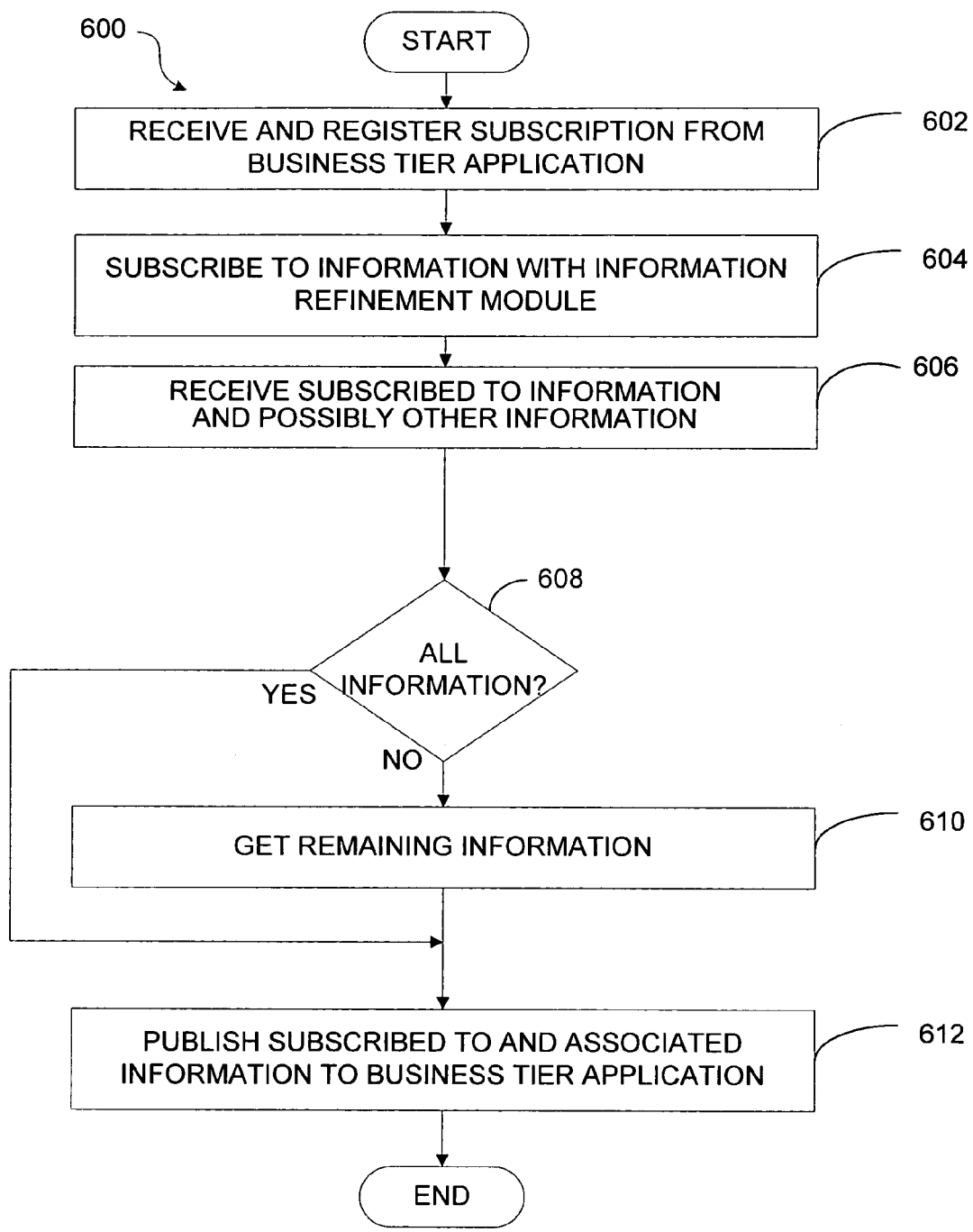
FIG. 6 depicts a flow diagram illustrating exemplary steps performed by the data latching module.

FIG. 6 depicts a flow diagram 600 illustrating exemplary steps performed by the data latching module consistent with the present invention. First, the data latching module receives and registers the subscription for information from the business tier application (step 602). For simplicity, the data latching module is described as receiving subscription information from a single business tier application, however, the data latching module can manage subscriptions for more than one of the business tier applications. After registering the subscription with the business tier application, the data latching module registers a similar subscription with the information refinement module (step 604). That is, the data latching module subscribes to the same information from the information refinement module that the business tier application subscribed to from the data latching module. Accordingly, each of the data latching module and business tier application can receive the subscribed to information asynchronously, improving their respective performances.

As will be described below, the information refinement module monitors information in the resource tier system and compares the information with its registered subscriptions. When comparing the information to its registered subscriptions, the information refinement module looks for subscribed to information as well as associated information as defined by the subscribed to information's information model. After the information refinement model acquires the subscribed to information, and any associated information acquired up to that point in time, the information refinement module publishes the information, which is received by the data latching module by its subscription for the information (step 606).

The data latching module compares the received information to the information model to which the subscribed to information belongs to determine whether all of the associated information has been received (step 608). For example, in the illustrative example, the data latching module may have received nodes 410, 402, and 406, but not nodes 404 and 408. If all of the associated information has not been received in step 608, then the data latching module retrieves the remaining associated information from the resource tier system (step 610). The information is retrieved, for example, by querying the resource tier system database for the desired information.

After the data latching module has the information to which the business tier application has subscribed and all of the associated information, as defined by the relevant information model, the data latching module publishes the combined information to the network, where it is received by the business tier application (step 612). Therefore, the business tier application receives the subscribed to information and associated information while they are timely with respect to each other, allowing the business tier applications to be most effective.

Figure 7:
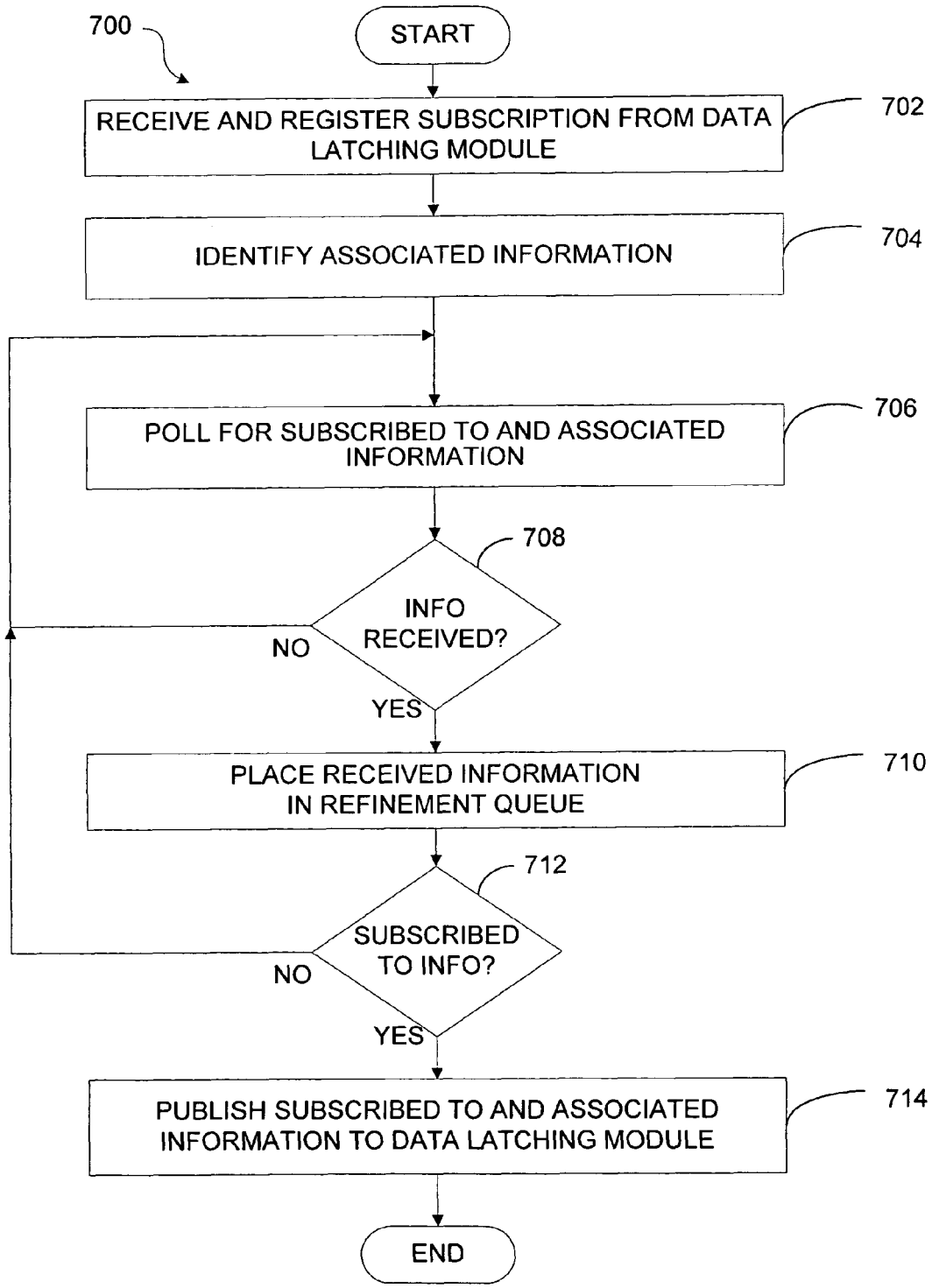
FIG. 7 depicts a flow diagram illustrating exemplary steps performed by the information refinement module.

FIG. 7 shows a flow diagram 700 illustrating exemplary steps performed by the information refinement module consistent with the present invention. As shown in FIG. 7, the information refinement module receives and registers the subscription from the data latching module (step 702). As described above, the subscribed to information may be part of an information model that includes associated information. Therefore, the information refinement module identifies the information model to which the subscribed to information belongs and determines the associated information from the information model (step 704). For example, in the illustrative example, the data latching module subscribes to information model node 410. The information refinement module finds the information model to which node 410 belongs, and therefore identifies associated nodes 402, 404, 406, and 408.

Then, the information refinement module attempts to retrieve the subscribed to information and the associated information by polling the database for the information (step 706). Since the desired information may not yet be present in the database and may arrive in the database in no particular order, one or more portions of the associated information may arrive prior to the subscribed to information. If none of the desired information has arrived in the database (step 708), then the information refinement module continues to poll the database in step 706. However, when the subscribed to information or one of the associated information arrives in the database, then the information refinement module receives the information and places the information in a refinement queue (step 710). The refinement queue is a data structure that holds the information until it is ready to be published to the data latching module. The information is held in the refinement queue until the subscribed to information is present in the refinement queue (step 712). Therefore, if the information that is placed in the refinement queue is associated information (e.g., node 402) and not the subscribed to information (e.g., node 410), then processing returns to step 706 to poll for additional information. However, if the subscribed to information is present in the queue in step 712, then the information refinement module publishes the subscribed to information and any associated information that may be present in the queue to the network, where it is received by the data latching module (step 714). As described above, the data latching module may then retrieve the remaining associated information from the database if required.

Therefore, in the illustrative example, the business tier application desires to receive information relating to system problem reports and subscribes to node 410. As shown in the illustrative information model in FIG. 4, node 410 is associated with other nodes. The information in the associated nodes may be most relevant when that information is received by the business tier application in a timely manner together with node 410. For example, it may be beneficial for the business tier application to receive the system problem report of node 410 together with the new patch of node 406, so that the business tier application can apply the patch in a timely manner. The data latching module and the information refinement module work together to collect the subscribed to information and relevant associated information prior to publishing the subscribed to information to the business tier application. Thus, the business tier information receives what it asked for as well as other relevant information that is timely.

Accordingly, the business tier application is not burdened by having to poll for information, but instead receives information asynchronously through subscription. Further, although the business tier application may subscribe to a particular type of information, other relevant information is also provided to the business tier application along with the subscribed to information. This enables the business tier application to be more effective. Further, the subscribe to information and related information are held, before publishing to the business tier application, until all of the relevant information is gathered. Thus, the various pieces of information that are received by the business tier application are timely with respect to each other.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A data processing system including a processor and a memory running a business tier application, the data processing system performing a method comprising the steps of:

with a data latching module, subscribing to a first information; and with the data latching module, receiving the first information, from an information refinement module, together with other information that is associated with the first information responsive to an information model, the information model including a plurality of information model nodes linked together by data associations with the first information provided in one of the information model nodes and the other information provided in other ones of the information model nodes defined by the data associations, with the information refinement module, determining if all other information associated with the first information is received by comparing the first information with the information model including examining the data associations defining the other ones of the information model nodes;

forwarding a first portion of the other information to the data latching module from the information refinement module; and with the data latching module, obtaining from a resource tier system based on the information model a second portion of the other information when it is determined that the first information is associated with the other information and the first portion is missing a portion of the other information, wherein, the data latching modules acts as a publisher of the first information together with the first and second portions of the other information to a network only after processing the information model to determine that all of the other information is received and delaying publishing the first information and the other information to the network until all of the other information is received, wherein the receiving and forwarding steps are performed asynchronously.

2. A computer-readable storage medium containing instructions that cause a data processing system having a program to perform a method comprising the steps of:

subscribing to a first information with a data latching module;

with the data latching module, receiving the first information, from an information refinement module, together with other information that is associated with the first information according to an information model, the information model including a plurality of information model nodes linked together by data associations with the first information provided in one of the information model nodes and the other information provided in other ones of the information model nodes defined by the data associations;

with the information refinement module, determining if all associated information is received by comparing the first information with the information model including examining the data associations defining the other ones of the information model nodes;

forwarding a first portion of the other information to the data latching module from the information refinement module; and with the data latching module, obtaining from a resource tier system based on the information model a second portion of the other information when it is determined that the first information is associated with the other information and the first portion is missing a portion of the other information, wherein, the data latching module acts as a publisher of the first information together with the other information to a network only after processing the information model to determine that all of the other information is received and delaying publishing the first information together with the other information to the network until all of the other information is received, wherein the receiving and forwarding are performed asynchronously.

3. A data processing system comprising:
a memory having a program that
subscribes to a first information with a data latching module,
with the data latching module, receives the first information, from an information refinement module, together with other information that is associated with the first information according to an information model, the information model including a plurality of information model nodes linked together by data associations with the first information provided in one of the information model nodes and the other information provided in other ones of the information model nodes defined by the data associations,
determines if all associated information is received by comparing the first information with the information model including examining the data associations defining the other ones of the information model nodes;
forwards a first portion of the other information to the data latching module from the information refinement module; and
with the data latching module, obtains a second portion of the other information when the first information is determined to be associated with the other information and to be missing a portion of the other information,
wherein, the data latching module acts as a publisher of the first information together with the first and second portions of the other information to a network only after processing the information model to determine that all of the other information is received and delaying publishing the first information together with the other information until all of the other information is received, wherein the receiving and forwarding steps are performed asynchronously, and
a processing unit that runs the program.

4. A data processing system having a processor and a memory running a program, the data processing system performing a method comprising the steps of:

with a data latching module, subscribing to a first information associated with a first node of an information model;

with the data latching module, receiving the first information responsive to the subscription from an information refinement module;

with the information refinement module, determining whether the first information is associated with other information by analyzing the information model to which the first node belongs, the information model identifying the first information and the associated other information by a plurality of static data associations among a plurality of nodes of the information model starting with the first node;

forwarding a first portion of the other information to the data latching module from the information refinement module;

obtaining a second portion of the other information, when it is determined that the first information is associated with the other information and the first portion is missing a portion of the other information, by accessing a resource tier system with the data latching module using the information model as an interface to stored data; and with the data latching module, publishing the first information together with the first and second portions of the other information to a network only after processing the information model to determine that all of the other information is received and delaying the publishing of the first information and other information to the network until all of the other information is received, wherein the receiving and forwarding steps are performed asynchronously.

5. The method of claim 4, wherein the other information includes a plurality of other information, and wherein the step of obtaining the other information includes obtaining the plurality of other information.

6. The method of claim 4, wherein the other information is obtained from a database.

7. A computer-readable storage medium containing instructions that cause a data processing system having a program to perform a method comprising the steps of:
   with a data latching module, subscribing to a first information associated with a first node of an information model;
   with the data latching module, receiving the first information responsive to the subscription from an information refinement module;
   with the information refinement module, determining whether the first information is associated with other information by analyzing the information model to which the first node belongs, the information model identifying the first information and the associated other information by a plurality of static data associations among a plurality of nodes of the information model starting with the first node;
   forwarding a first portion of the other information to the data latching module from the information refinement module;
   obtaining a second portion of the other information, when it is determined that the first information is associated with the other information and the first portion is missing a portion of the other information, by accessing a resource tier system with the data latching module using the information model as an interface to stored data; and
   with the data latching module, publishing the first information together with the other information to a network only after processing the information model to determine that all of the other information is received and delaying the publishing of the first information and other information to the network until all of the other information is received, wherein the receiving and forwarding steps are performed asynchronously.

8. The computer-readable medium of claim 7, wherein the other information includes a plurality of other information, and wherein the step of obtaining the other information includes obtaining the plurality of other information.

9. The computer-readable medium of claim 7, wherein the other information is obtained from a database.

10. The data processing system of claim 4, wherein the forwarding of the first portion of the other information is performed prior to the receiving of the first information.

11. The data processing system of claim 4, wherein the information refinement module periodically polls a resource tier system for the first information and the other information associated with the first information.

12. The data processing system of claim 11, wherein the data latching module queries the resource tier system to perform the obtaining of the second portion of the other information.

13. The data processing system of claim 4, further including prior to the forwarding and the receiving, first storing with the information refinement module the first portion of the other information in a refinement queue and second storing the first information in the refinement queue, wherein the forwarding of the first portion is performed after the second storing and is coordinated with transmitting the first information to the data latching module.

\* \* \* \* \*